No. 634,993. Patented Oct. 17, 1899.
C. A. McNAUGHTON.
RUNNING GEAR FOR VEHICLES.
(Application filed June 23, 1899.)

(No Model.)

Witnesses

C. A. McNaughton, Inventor.

By his Attorneys,

THE NORRIS PETERS CO., PHOTO-LITHO., WASHINGTON, D. C.

UNITED STATES PATENT OFFICE.

CHARLES A. McNAUGHTON, OF SPRAGUE'S MILL, MAINE.

RUNNING-GEAR FOR VEHICLES.

SPECIFICATION forming part of Letters Patent No. 634,993, dated October 17, 1899.

Application filed June 23, 1899. Serial No. 721,605. (No model.)

*To all whom it may concern:*

Be it known that I, CHARLES A. MCNAUGHTON, a citizen of the United States, residing at Sprague's Mill, in the county of Aroostook and State of Maine, have invented a new and useful Running-Gear, of which the following is a specification.

The invention relates to improvements in running-gear.

The object of the present invention is to improve the construction of running-gear for vehicles, more especially the means for mounting the front bolster on the front axle, and to provide a simple, light, and durable construction which will be especially adapted for lumber-wagons and similar vehicles.

The invention consists in the construction and novel combination and arrangement of parts hereinafter fully described, illustrated in the accompanying drawings, and pointed out in the claims hereto appended.

Figure 1:
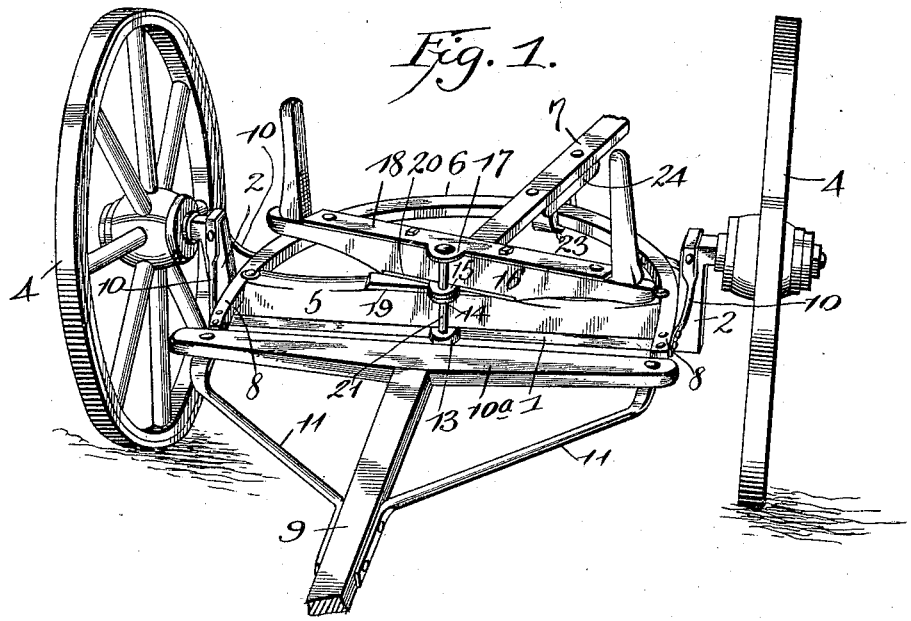
Figure 2:
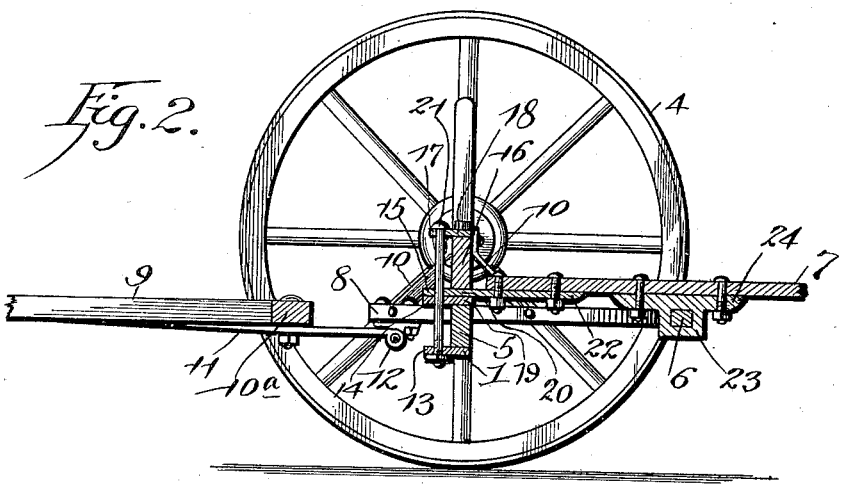

In the drawings, Figure 1 is a perspective view of a portion of a running-gear constructed in accordance with this invention. Fig. 2 is a longitudinal sectional view of the same.

Like numerals of reference designate corresponding parts in both figures of the drawings.

1 designates a drop-axle arranged at the front of a running-gear and provided at its ends with upwardly-extending L-shaped arms 2, terminating in horizontal journals upon which are mounted the front wheels 4. The central portion of the drop-axle has an axle-bed 5 secured to it, and a curved bar 6, which constitutes the front hounds and which forms a guide for the reach 7, is secured to the axle at the ends of the bed 5. The curved bar 6, which is substantially simicircular, projects in advance of the front axle and forms a pair of arms 8, to which the pole 9 is coupled. The arms of the axle are supported by side braces 10, having oppositely-inclined portions extending in advance and in rear of the arms 2, as clearly illustrated in Fig. 1 of the accompanying drawings, and the central portions of the side braces are substantially rectangular and fit the upper ends of the arms 2, to which they are secured.

The pole or tongue 9 is provided at its rear end with a cross-bar 10ª, which is supported by rearwardly-diverging bracing-rods 11, and the rear terminals of the latter are provided with eyes 12, which are coupled to suitable eyes or ears located at the ends of the semicircular bar 6. The front ends of the rods 11 are secured to the side edges of the tongue or pole, as clearly shown in Fig. 1 of the accompanying drawings.

The drop-axle is provided with a centrally-arranged forwardly-projecting perforated ear 13, which registers with corresponding ears 14 and 15 of bearing-plates of the axle and the front bolster 16 and with an ear 17 of a plate 18, secured to the upper face of the bolster. The ears 14 and 15 are formed by extensions of the bearing-plates 19 and 20, which constitute the fifth-wheel of the running-gear. The said ears, which are vertically alined, receive a vertical king-bolt 21, which is located in front of the front axle and which is preferably provided at its lower end with a nut; but a key or any other suitable fastening device may be employed for retaining it in the perforations of the forwardly-projecting ears.

The upper bearing-plate 20 is provided with a rearwardly-projecting arm 22, to which the front end of the reach 7 is bolted, and the said reach is provided with a depending eye 23 to receive the curved bar 6, whereby the front axle is guided in turning a vehicle. The eye is preferably formed integral with a bracket or plate 24, which is bolted or otherwise secured to the reach. The front bolster is provided at its ends with standards, and the top plate 18, which forms a wear-plate, extends across the entire space between the standards.

It will be seen that the front portion of the running-gear is simple and comparatively inexpensive in construction, that it is light, strong, and durable, and that it is especially adapted for long vehicles, such as lumber-wagons and the like.

Changes in the form, proportion, size, and the minor details of construction within the scope of the appended claims may be resorted to without departing from the spirit or sacrificing any of the advantages of this invention.

What is claimed is—

1. A device of the class described comprising an axle provided at its bottom with a forwardly-projecting ear and having an axle-bed, a bolster, bearing-plates interposed between the bolster and the axle-bed and provided with ears arranged in alinement with the ear of the axle, an upper plate provided with an ear, a king-bolt passing through the said ears, a substantially semicircular bar extending rearward from the axle and having its terminals projecting forwardly therefrom, a pole coupled to the ends of the curved bar, and a reach provided with a depending eye receiving the curved bar, substantially as described.

2. A device of the class described comprising a drop-axle having an axle-bed, a substantially semicircular bar extending rearward from the axle and having its terminals projecting forwardly therefrom, a pole coupled to the ends of the curved bar, side braces extending from the arms of the axle to the bar, a bolster mounted upon the axle, and a reach provided with a depending eye receiving the curved bar, substantially as described.

3. A device of the class described comprising a drop-axle having upwardly-extending L-shaped arms terminating in horizontal spindles, an axle-bed 5 secured to the axle and arranged between the vertical portions of the arms, the substantially semicircular bar extending rearward from the axle and having its sides interposed between the ends of the axle-bed and the said arms, the side braces extending from the tops of the arms to the said bar, a reach, and a pole, substantially as described.

In testimony that I claim the foregoing as my own I have hereto affixed my signature in the presence of two witnesses.

CHAS. A. McNAUGHTON.

Witnesses:
CHAS. P. ALLEN,
BURDEN E. DOW.